United States Patent
Banerjea

(10) Patent No.: US 8,355,380 B1
(45) Date of Patent: Jan. 15, 2013

(54) MESH POWER CONSERVATION

(75) Inventor: Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 761 days.

(21) Appl. No.: 12/401,308

(22) Filed: Mar. 10, 2009

Related U.S. Application Data

(60) Provisional application No. 61/038,884, filed on Mar. 24, 2008.

(51) Int. Cl.
*H04W 4/00* (2009.01)

(52) U.S. Cl. ........ 370/331; 370/236; 370/338; 455/572; 455/574

(58) Field of Classification Search .................... 370/331
See application file for complete search history.

(56) References Cited

U.S. PATENT DOCUMENTS

| 2004/0185918 | A1* | 9/2004 | Fan et al. ...................... 455/574 |
| 2004/0259542 | A1* | 12/2004 | Viitamaki et al. ......... 455/426.2 |
| 2007/0286080 | A1* | 12/2007 | Kim et al. ..................... 370/236 |

OTHER PUBLICATIONS

Liu Tianxi, et al., "Quorum-Based Energy Conserving Mechanism in Wireless Mesh Networks", ZTE Corporation, pp. 1-9, http://wwwen.zte.com/cn/main/include/showemagazinearticle.jsp?articleID=11732&catal...

Joseph D. Camp and Edward W. Knightly, "The IEEE 802.11s Extended Service Set Mesh Networking Standard", Electrical and Computer Engineering, Rice University, Houston, TX {camp, knightly}@ece.rice.edu.

"Overview of the Amendment for Wireless Local Area Mesh Networking", IEEE 802.11s Tutorial, Nov. 2006.

* cited by examiner

*Primary Examiner* — Ricky Ngo
*Assistant Examiner* — Richard K Chang

(57) ABSTRACT

A method and apparatus for conserving power in a mesh point in which in response to the mesh point participating in mesh activity while in an awake mode, the mesh point continues in the awake mode for a first awake time period. In response to the first awake time period expiring without the mesh point participating in the mesh activity, the mesh point is operated in a low power mode for a first sleep time period. In response to the first sleep time period expiring, the mesh point is operated in the awake mode for a second awake time period to detect additional mesh activity. And in response to the second awake time period expiring without detecting the additional mesh activity, the mesh point is operated point in the low power mode for a second sleep time period.

11 Claims, 3 Drawing Sheets

MESH POWER CONSERVATION

CROSS REFERENCE TO RELATED APPLICATIONS

This application claims the benefit of provisional Patent Application Ser. No. 61/038,884, filed Mar. 24, 2008, assigned to the assignee of the present application and incorporated herein by reference.

BACKGROUND

Institute of Electrical and Electronics Engineers (IEEE) 802.11s is a draft amendment to an international wireless LAN (WLAN) standard that describes a mesh network. WLAN devices in a mesh network are referred to as mesh points (MP). The MPs form mesh links with one another, over which mesh paths can be established using a routing protocol. The MPs have relay functions for wirelessly communicating directly with each other, instead of going through centralized control equipment such as a base station.

In a mesh network, data transmitted from one device may arrive at a destination via a sequence of MPs resulting in a multi-hop wireless network configuration. The mesh network of interconnected wireless links between the MPs enables automatic topology learning and dynamic path configuration/reconfiguration around inoperable paths by hopping from MP to MP until the destination is reached.

Communication between different MPs is controlled primarily through a Medium Access Control (MAC) protocol that uses IEEE 802.11 MAC/PHY layers to determine routes through the mesh network. In the MAC routing protocol, each MP learns about neighboring MPs using a neighbor discovery protocol based on received beacons or response management frames. Neighbors and neighbor's neighbors information is provided within the beacon management frames. Therefore, each MP can rapidly discover mesh points up to two hops away.

The MPs may be implemented as devices either plug-in AC powered devices such as a laptop, a microwave, and the like; or as battery operated DC powered devices such as a picture frame, a camera, and a cellular phone, for instance. MPs that have a connection to a power source may stay continuously awake, but battery operated MPs may optionally support a power save mode to conserve their battery.

IEEE 802.11 supports two power modes: active mode and power saving mode, assuming clock synchronization of the MPs is available. Synchronization may be achieved by each MP updating time stamp and offset information with information received in beacons and probe responses from other MPs. Once synchronized, time in the mesh network is divided into equal-length beacon intervals, each of which starts with an Ad Hoc Traffic Indication Message (ATIM) window. MPs are required to stay awake during the ATIM window so that control communication can be transferred between the MPs. For example, the ATIM window may be used by the MPs to indicate pending traffic, a change in PS state or re-instating stopped traffic flows. Any MP not receiving an ATIM frame within the ATIM window may enter the power save mode after the ATIM window expires. In certain circumstances, an MP receiving ATIM frames may remain active for a time after the ATIM window finishes in order to send or receive more data frames. MPs not in the power save mode may communicate with MPs in power save mode by buffering the data to be sent and then sending the data during another ATIM window.

Although the conventional power saving approach attempts to conserve power by requiring each MP to go to sleep after data transmission or reception, and wake up when there is data to be transmitted or received, the approach requires global scheduling because the MPs must synchronize and wake up at the same time to send or receive data. In addition to the drawback of requiring synchronization between the MPs, another drawback is that while the MPs are in power save mode, there is no connectivity between active MPs and the MPs in power save mode.

BRIEF SUMMARY

The exemplary embodiment provides a method and apparatus for conserving power in a mesh point in which in response to the mesh point participating in mesh activity while in an awake mode, the mesh point continues in the awake mode for a first awake time period. In response to the first awake time period expiring without the mesh point participating in the mesh activity, the mesh point is operated in a low power mode for a first sleep time period. In response to the first sleep time period expiring, the mesh point is operated in the awake mode for a second awake time period to detect additional mesh activity. And in response to the second awake time period expiring without detecting the additional mesh activity, the mesh point is operated point in the low power mode for a second sleep time period.

DETAILED DESCRIPTION

The present invention relates to mesh power conservation. The following description is presented to enable one of ordinary skill in the art to make and use the invention and is provided in the context of a patent application and its requirements. Various modifications to the preferred embodiments and the generic principles and features described herein will be readily apparent. Thus, the present invention is not intended to be limited to the embodiments shown, but is to be accorded the widest scope consistent with the principles and features described herein.

The exemplary embodiment provides a method and system for mesh power conservation that allow wireless mesh devices to conserve battery by entering a low power-mode, while simultaneously providing connectivity with active mesh devices through participation in mesh activities.

The exemplary embodiments are mainly described in terms of particular systems provided in particular implementations. Although the exemplary embodiment may be implemented as an architecture and protocol for providing an Electrical and Electronics Engineers (IEEE) 802.11 Extended Service Set (ESS) Mesh using the IEEE 802.11 MAC/PHY layers to create an IEEE 802.11 Wireless Distribution System that supports both broadcast/multicast and unicast delivery at the MAC layer over self-configuring multi-hop topologies, this method and system will operate effectively in other implementations. For example, the systems, devices, and networks usable with the present invention can take a number of different forms. The exemplary embodiments will also be described in the context of particular methods having certain steps. However, the method and system operate effectively for other methods having different and/or additional steps and steps in different orders not inconsistent with the exemplary embodiments.

Figure 1:
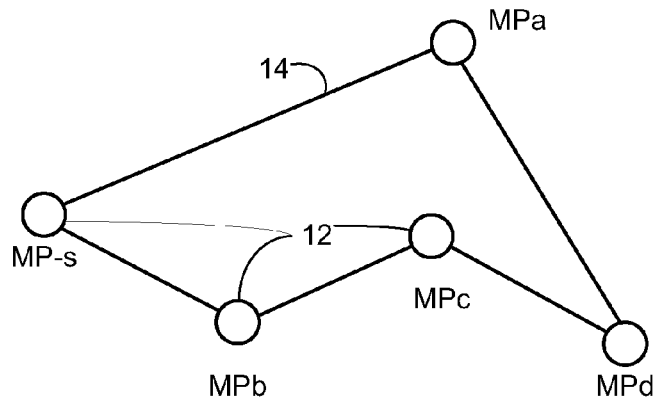
FIG. 1 is a block diagram of an exemplary mesh network having mesh power conservation in accordance with an exemplary embodiment.

FIG. 1 is a block diagram of an exemplary mesh network having mesh power conservation in accordance with an exemplary embodiment. The mesh network 10 comprises multiple mesh points (MPs) equipped with WLAN mesh network functions. The MPs may comprise individual wireless devices using mesh services to communicate with other wireless devices in the network. The MPs may also comprise access points equipped with both MP functions and access point functions for providing access to the mesh network to mobile clients, and/or a mesh portal equipped with both MP functions and a gateway function for providing access to an external network.

The mesh network 10 may include a plurality of MPs 12, designated here as MP-s and MPa through MPd. Using the WLAN mesh network functions, the MPs 12 form mesh links with one another, over which mesh paths 14 can be established. In one embodiment, communication and mesh paths 14 may be established between the MPs using a routing protocol. According to the routing protocol, communication between different MPs is either traffic between the MPs for internal management, which is called MP traffic, or traffic transmitted as a result of communication between an MP and a station, which is called AP traffic. In one embodiment, the routing protocol may be based on the Medium Access Control (MAC) layer. Example MAC layer routing protocols include Ad-Hoc On-Demand Distance Vector (AODV) and Optimized Link State Routing Protocol (OLSR). Alternatively, a proprietary routing protocol may be used.

During MP traffic, each MP learns about neighboring MPs using a neighbor discovery protocol based on received beacons and response management frames, which comprise a series of packets (alternatively, neighboring MPs may be discovered using some other external protocol). Neighbors and neighbor's neighbors information is provided within the beacon management frames. Through the routing protocol, one MP can discover other MPs and determine a path 14 to reach the destination through intermediate MPs. The intermediate MPs are required to forward traffic to the final destination. The intermediate nodes also participate in mesh discovery.

For example, when source MP-s wants to send data to MPd, MP-s performs route discovery using management frames. At the end of route discovery, MP-s obtains a path 14 to reach MPd through, for example MPa, which is an intermediate MP that also participates in route discovery. During the AP traffic period, data packets are routed from MP-s to MPd through MPa. Periodically during MP traffic, MP-s might also initiate route discovery to MPd to determine if other routes exist. Each MP maintains a list of neighboring nodes and routes to other nodes in a route table.

In the above example, however, all the MPs are awake and therefore consume power. Remaining continuously awake is not appropriate for battery powered MPs 12. Accordingly, the exemplary embodiment provides a method and apparatus for mesh power conservation that allows an MP 12 to enter a low power mode, while at the same time allowing the MP 12 to participate in route discovery.

Figure 2:
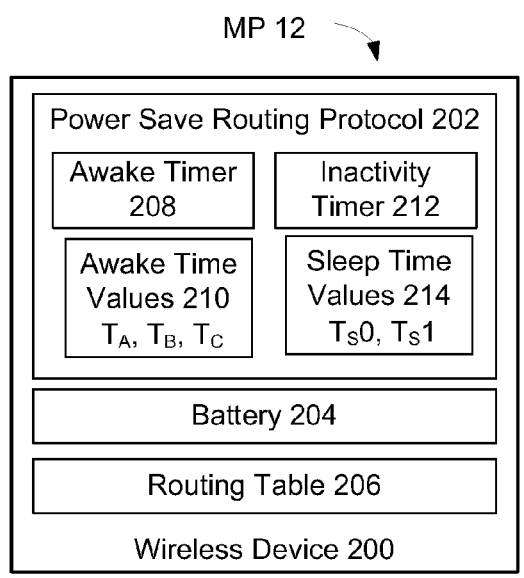
FIG. 2 is a diagram illustrating an exemplary configuration of an MP having a power save routing protocol.

FIG. 2 is a diagram illustrating an exemplary configuration of an MP having a power save routing protocol. According to one exemplary embodiment, the MP 12 comprises a battery-powered wireless device 200 that includes a power save routing protocol 202 executed by a processor (not shown), a battery 204, and a routing table 206. The power save routing protocol 202 performs power management for the MP 12. In one embodiment, the power save routing protocol 202 performs power management functions using at least one awake timer 208, which may be set to any one of a plurality of awake time values 210 (e.g., $T_A$ and $T_B$), and at least one inactivity timer 212, which may be set to any one of a plurality of sleep time values 214 (e.g., $T_S0$ and $T_S1$). The power save routing protocol 202 conserves battery power for the MP 12 by placing the MP 12 in a low power mode, while allowing the MP to simultaneously participate in mesh activities, as described below. At least one of the MPs 12 or all the MPs 12 in the mesh network 10 may run the power save routing protocol 202.

Figure 3:
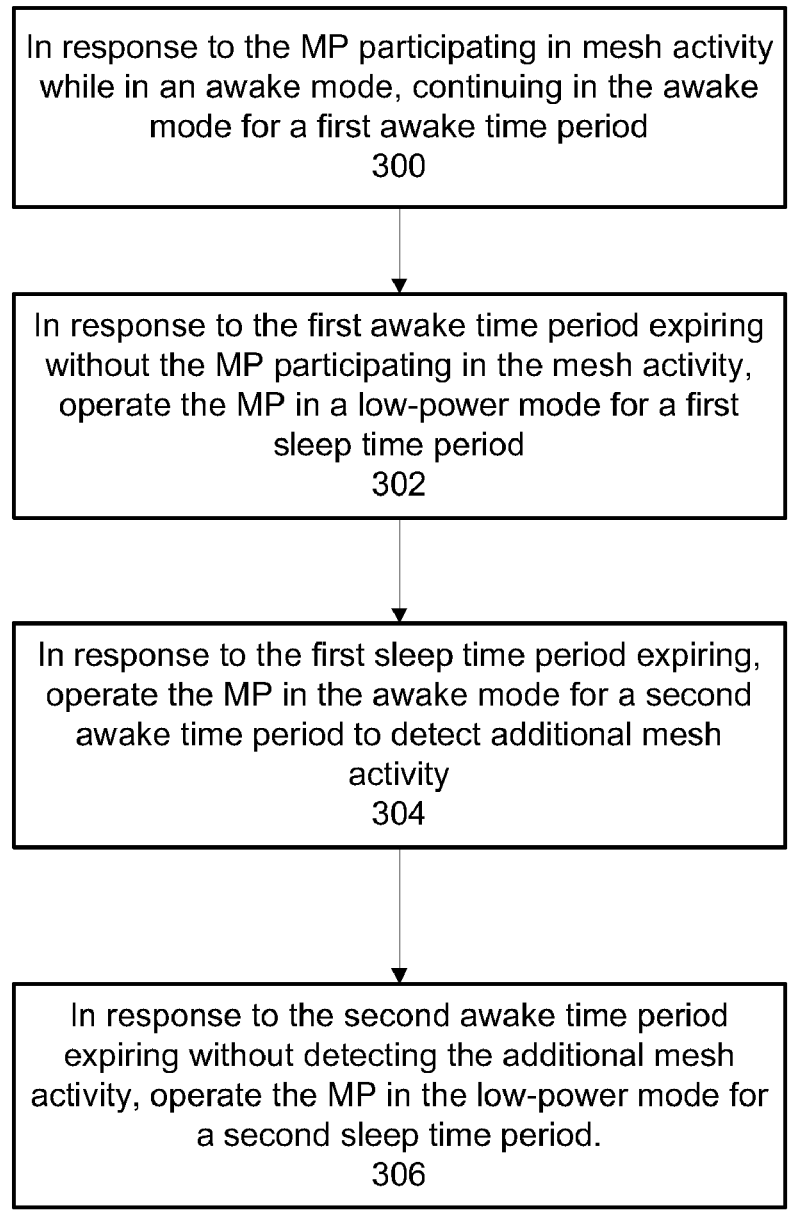
FIG. 3 is a flow diagram illustrating the process for providing mesh power conservation according to an exemplary embodiment.

FIG. 3 is a flow diagram illustrating the process for providing mesh power conservation according to an exemplary embodiment. The processes may include: in response to the MP 12 participating in mesh activity while in an awake mode, continuing in the awake mode for a first awake time period (block 300). In this embodiment, the MP 12 can be thought of as running in normal operating mode. When the power save routing protocol 202 detects mesh activity, the first awake time period is started. The duration of the first awake time period may be controlled by setting the activity timer 208 to one of the active time values 210 (e.g., $T_A$) and then starting the activity timer 208. Thus, the MP 12 may stay in the awake mode for a time independent of any Ad Hoc Traffic indication Message (ATIM) received during a beacon interval.

In response to the first awake time period expiring without the MP 12 participating in the mesh activity, the power save routing protocol 202 operates the MP 12 in a low power mode for a first sleep time period to conserve power (block 302). The duration of the first sleep time period may be controlled by setting the inactivity timer 212 to one of the sleep time values 214 (e.g., $T_S0$) and then starting the inactivity timer 212.

In response to the first sleep time period expiring, the power save routing protocol 202 operates the MP 12 in the awake mode for a second awake time period to detect additional mesh activity (block 304). The duration of the second awake time period may be controlled by setting the activity timer 208 to one of the active time values 210 (e.g., $T_B$) and then starting the activity timer 208.

In response to the second awake time period expiring without detecting the additional mesh activity, the power save routing protocol 202 operates the MP 12 in the low power mode for a second sleep time period (block 306). The duration of the second sleep time period may be controlled by setting the inactivity timer 212 to one of the sleep time values 214 (e.g., $T_S1$) and then starting the inactivity timer 212.

Figure 4A:
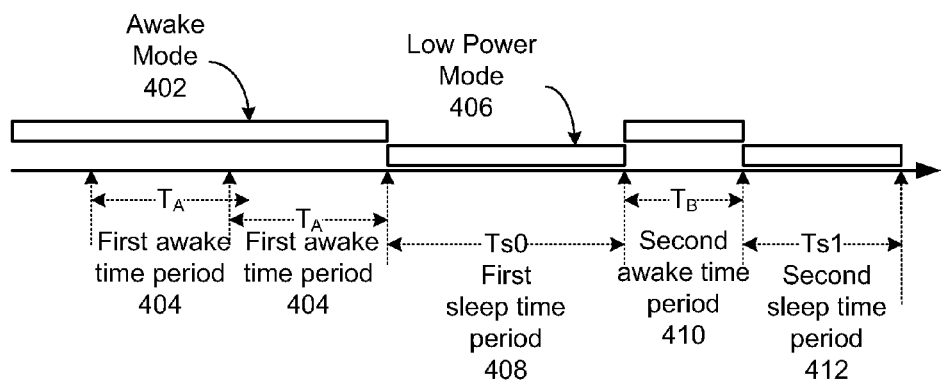
FIGS. 4A and 4B are diagrams further describing the power save routing protocol through example timelines.
Figure 4B:
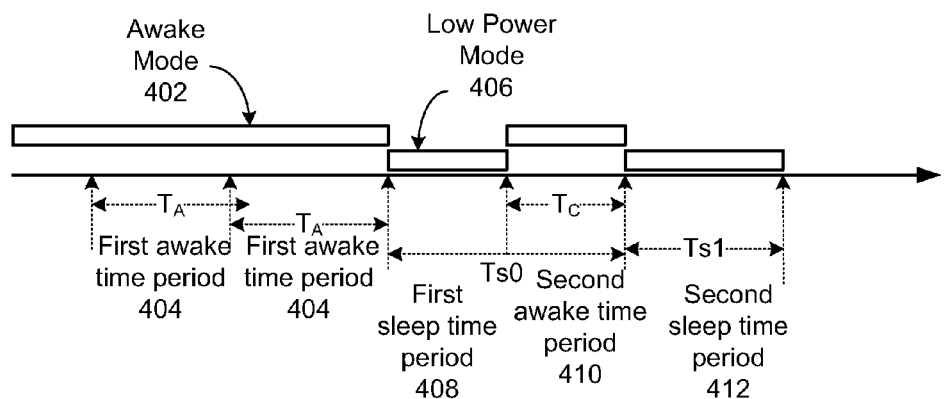

FIGS. 4A and 4B are diagrams further describing the power save routing protocol through example timelines 400 and 420. Referring to FIG. 4A, the MP is in awake mode 402 when the MP participates in mesh activity, such as receiving a mesh packet to forward. In response, the MP resets the awake timer 208 to awake time value $T_A$ and begins the first awake time period 404. Before time Ta expires, the MP receives another packet to forward and again resets the awake timer 208 to the awake time value $T_A$ and restarts the first awake time period 404.

As the MP fails to detect any further mesh activity before time $T_A$ expires, the MP sets the inactivity timer 212 to a sleep time value $T_S0$ and enters low power mode 406, which begins the first sleep time period 408. After time $T_S0$ expires, the MP starts the activity timer 208 for a duration of awake time $T_B$, and enters awake mode 402, which begins the second awake time period 410. If the MP does not receive any mesh packets during the second awake time period 410 of $T_B$ duration, the MP sets the inactivity timer 212 to sleep time value $T_S1$ and enters low power mode 406 for a second sleep time period 412. After time $T_S1$ expires, the MP again operates in the awake mode 402, and the process continues.

In one embodiment, the durations of the first and second awake time periods 404 and 410, and the first and second sleep time periods 408 and 412 may be made variable by selecting different awake and sleep time values 210 and 214 based on the type of the mesh activity currently detected by the power save routing protocol 202. In one embodiment, the types of mesh activity the MP 12 may participate in include forwarding received mesh pockets, participating in mesh discovery, and receiving mesh packets intended for the MP 12. Because the awake and sleep time values 210 and 214 are stored in the MP 12 and not received in beacons and probe responses from other MPs, no synchronization between the MPs of a mesh network is required for power management.

In one embodiment, the first awake time value $T_A$ may be the same or different from the second awake time value $T_B$; and the first sleep time value $T_S0$ may be the same or different from the second sleep time value $T_S1$. For example, assume the first awake time period 404 is longer than the second awake time period 410 because the first and second awake time values $T_A$ and $T_B$ are different. In this case, if the MP participates in any mesh activity during the second awake time period 410, the power save routing protocol 202 may restart the first awake time period 404 and operate as normal.

According to the exemplary embodiment, the power save routing protocol 202 provides a power management scheme that allows battery powered MPs 12 with low mesh activity or those not participating in mesh packet forwarding to enter the low power mode and to conserve battery power without requiring synchronization between MPs 12. That is, power save routing protocol 202 does not require communication between the MPs 12 in order for the MPs 12 to enter low power mode. A further advantage is that the power save routing protocol 202 allows mesh routing to occur based on the current state of the MP's battery 204 such that mesh packets are not routed through MPs whose battery condition is poor, thus allowing those MPs to stay in low power mode for longer durations and to conserve more power than they otherwise would.

FIG. 4B is a diagram showing another example of the power save routing protocol through a timeline 420. In this example, the MP 12 has entered low power mode 406, as described with respect to FIG. 4A. While in the first sleep time period 408, however, an application is started that sends the MP 12 a mesh packed to transmit. For example, assume an application running on a PC wirelessly transmits a picture to an electronic picture frame, which includes a battery operated MP 12. Receipt of the mesh packet wakes up the MP 12 and the MP 12 starts the activity timer 208 for a duration of awake time $T_C$, which begins the second awake time period 410.

In this example, the duration of the second awake time period 410, $T_C$, is shortened to coincide with expiration of the first sleep time period 408. If the MP initiates mesh route discovery or participates in mesh route discovery, then the activity timer 208 may be set to a longer duration than $T_C$. As described above, the power save routing protocol 202 may set the activity timer 208 and the inactivity timer 212 of the MP to different time values depending on the type of mesh activity detected.

A method and apparatus for providing mesh power conservation has been disclosed that does not require synchronization between the MPs for the MPs to enter low power mode and conserve power. The present invention has been described in accordance with the embodiments shown, and there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

I claim:

1. A method for conserving power in a mesh point, the method comprising:
   in response to the mesh point participating in mesh activity while operating in an awake mode, continuing to operate the mesh point in the awake mode for a first awake time period;
   in response to the first awake time period expiring without the mesh point participating in the mesh activity, (1) setting an inactivity timer to a first sleep time value at a start of a first sleep time period, an expiration of the inactivity timer after a period corresponding to the first sleep time value indicating the end of the first sleep time period, and (2) operating the mesh point in a low power mode for the first sleep time period;
   in response to the first sleep time period expiring, operating the mesh point in the awake mode for a second awake time period to detect additional mesh activity; and
   in response to the second awake time period expiring without detecting the additional mesh activity, operating the mesh point in the low power mode for a second sleep time period,
   wherein each of the first awake time period, the second awake time period, the first sleep time period, and the second sleep time period is variable based on a type of the mesh activity currently detected,
   wherein the first awake time period and the second awake time period are controlled by setting at least one activity timer to a first awake time value and a second awake time value, respectively;
   and the first sleep time period and the second sleep time period are controlled by setting at least one inactivity timer to a first sleep time value and a second sleep time value, respectively, and
   wherein each of the first awake time value, the second awake time value, the first sleep time value, and the second sleep time value is stored in the mesh point and not received in beacons and probe responses from other mesh points, such that no synchronization between mesh points of a mesh network is required for power management.

2. The method of claim 1; wherein continuing to operate the mesh point in the awake mode for the first awake time period further comprises continuing to operate the mesh point in the awake mode independent of receiving an Ad Hoc Traffic indication Message (ATIM).

3. The method of claim 1, wherein the mesh activity includes one or more of forwarding received mesh packets, taking part in mesh discovery, and receiving mesh packets intended for the mesh point.

4. The method of claim 1, wherein the first awake time value is different from the second awake time value; and the first sleep time value is different from the second sleep time value.

5. The method of claim 4, further comprising: in response to the mesh point participating in the additional mesh activity during the second awake time period, restarting the first awake time period.

6. A wireless device, comprising:
a processor;
a mixed mode security protocol executing on the processor wherein the wireless device operates as a mesh point, the mixed mode security protocol functional for:
in response to the mesh point participating in mesh activity while operating in an awake mode, continuing to operate the mesh point in the awake mode for a first awake time period;
setting an inactivity timer to a first sleep time value;
starting the inactivity timer in response to the first awake time period expiring without the mesh point participating in the mesh activity;
operating the mesh point in a lower power mode for a first time period equal to the first sleep time value;
operating the mesh point in the awake mode for a second awake time period to detect additional mesh activity, in response to the first sleep time period expiring; and
operating the mesh point in the low power mode for a second sleep time period in response to the second awake time period expiring without detecting the additional mesh activity,
wherein each of the first awake time period, the second awake time period, the first sleep time period, and the second sleep time period is variable based on a type of the mesh activity currently detected,
wherein the first awake time period and the second awake time period are controlled by setting at least one activity timer to a first awake time value and a second awake time value, respectively;
and the first sleep time period and the second sleep time period are controlled by setting at least one inactivity timer to a first sleep time value and a second sleep time value, respectively, and
wherein each of the first awake time value, the second awake time value, the first sleep time value, and the second sleep time value is stored in the mesh point and not received in beacons and probe responses from other mesh points, such that no synchronization between mesh points of a mesh network is required for power management.

7. The wireless device of claim 6, wherein continuing to operate the mesh point in the awake mode for the first awake time period further comprises continuing to operate the mesh point in the awake mode independent of receiving an Ad Hoc Traffic indication Message (ATIM).

8. The wireless device of claim 6, wherein the mesh activity includes one or more of forwarding received mesh packets, taking part in mesh discovery, and receiving mesh packets intended for the mesh point.

9. The wireless device of claim 6, wherein the first awake time value is different from the second awake time value; and the first sleep time value is different from the second sleep time value.

10. The wireless device of claim 9, wherein in response to the mesh point participating in the additional mesh activity during the second awake time period, the first awake time period is restarted.

11. A mesh network, comprising:
a plurality of mesh points; and
a routing protocol executing on at least one of the plurality of mesh points that is functional for:
operating the mesh point in an awake mode for a first awake time period in response to the mesh point participating in mesh activity while in the awake mode;
setting an inactivity timer to a first sleep time value;
starting the inactivity timer in response to the first awake time period expiring without the mesh point participating in the mesh activity;
operating the mesh point in a lower power mode for a first time period equal to the first sleep time value;
operating the mesh point in the awake mode for a second awake time period to detect additional mesh activity, in response to the first sleep time period expiring; and
operating the mesh point in the low power mode for a second sleep time period in response to the second awake time period expiring without detecting the additional mesh activity,
wherein each of the first awake time period, the second awake time period, the first sleep time period, and the second sleep time period is variable based on a type of the mesh activity currently detected,
wherein the first awake time period and the second awake time period are controlled by setting at least one activity timer to a first awake time value and a second awake time value, respectively;
and the first sleep time period and the second sleep time period are controlled by setting at least one inactivity timer to a first sleep time value and a second sleep time value, respectively, and
wherein each of the first awake time value, the second awake time value, the first sleep time value, and the second sleep time value is stored in the mesh point and not received in beacons and probe responses from other mesh points, such that no synchronization between mesh points of the mesh network is required for power management.

* * * * *